(12) United States Patent
Zisimopoulos et al.

(10) Patent No.: US 9,179,289 B2
(45) Date of Patent: Nov. 3, 2015

(54) METHOD AND SYSTEM FOR REMOTELY ACCESSING

(75) Inventors: Haris Zisimopoulos, Staines (GB); Huarui Liang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 139 days.

(21) Appl. No.: 13/389,940

(22) PCT Filed: Aug. 4, 2010

(86) PCT No.: PCT/KR2010/005113
§ 371 (c)(1),
(2), (4) Date: Feb. 10, 2012

(87) PCT Pub. No.: WO2011/019159
PCT Pub. Date: Feb. 17, 2011

(65) Prior Publication Data
US 2012/0147872 A1    Jun. 14, 2012

(30) Foreign Application Priority Data
Aug. 10, 2009    (CN) .......................... 2009 1 0159260

(51) Int. Cl.
*H04W 40/00* (2009.01)
*H04W 8/12* (2009.01)
*H04W 8/26* (2009.01)
*H04W 48/02* (2009.01)

(52) U.S. Cl.
CPC . *H04W 8/12* (2013.01); *H04W 8/26* (2013.01); *H04W 48/02* (2013.01)

(58) Field of Classification Search
None
See application file for complete search history.

(56) References Cited

U.S. PATENT DOCUMENTS

| 7,515,573 | B2  |   | 4/2009  | Bajic           |         |
|-----------|-----|---|---------|-----------------|---------|
| 2005/0013280 | A1 | * | 1/2005 | Buddhikot et al. | 370/349 |
| 2005/0229245 | A1 |   | 10/2005 | Nakano et al.  |         |
| 2006/0137005 | A1 |   | 6/2006  | Park            |         |
| 2006/0245404 | A1 | * | 11/2006 | Bajic          | 370/338 |
| 2008/0254768 | A1 | * | 10/2008 | Faccin         | 455/411 |
| 2009/0111472 | A1 | * | 4/2009  | Promenzio et al. | 455/439 |
| 2009/0265542 | A1 | * | 10/2009 | Khetawat et al. | 713/151 |
| 2009/0285179 | A1 | * | 11/2009 | Jones et al.   | 370/331 |

FOREIGN PATENT DOCUMENTS

| CN | 101466128 A      | 6/2009 |
|----|------------------|--------|
| JP | 2007-243458 A    | 9/2007 |
| KR | 10-2006-0053978 A | 5/2006 |
| KR | 10-2009-0053978 A | 5/2009 |

* cited by examiner

*Primary Examiner* — Hassan Kizou
*Assistant Examiner* — Tejis Daya
(74) *Attorney, Agent, or Firm* — Jefferson IP Law, LLP

(57) ABSTRACT

The invention provides a method and system for remotely accessing. A mobility management device receives a remote access requesting message sent by User Equipment (UE), determines whether the UE possesses right for accessing a home network under the control of a home base station according to contents in the remote access requesting message, when determining the UE possesses the right, selects a GateWay (GW) device. Technical scheme of the invention enables a subscriber to remotely access a home network, even if the subscriber is not in the home network.

12 Claims, 12 Drawing Sheets

METHOD AND SYSTEM FOR REMOTELY ACCESSING

TECHNICAL FIELD

The invention relates to mobile communication technologies, and more particularly, to a method and system for remotely accessing.

BACKGROUND ART

In order to provide better business service for a particular subscriber group, it is generally necessary to form a closed subscriber group (CSG) using multiple Radio Resources Management Entities (RRMEs) for a particular subscriber group in a mobile communication system. For example, all the subscribers within a company or a school belong to a particular subscriber group, and a CSG may be formed using multiple RRMEs for the subscriber group, so as to provide dedicated access service. RRME is a network entity in charge of managing radio resources in a Wireless Access Network (WAN), and in charge of accessing subscriber equipment, e.g., base station in each kind of mobile communication system.

The scene of forming a CSG with multiple RRMEs for a particular subscriber group is generally existed in mobile communication systems. In the following, a Long Term Evolution (LTE) system in System Architecture Evolution (SAE) is taken as an example for illustration.

FIG. 1 is a schematic diagram illustrating structure of LTE system in the prior art. As shown in FIG. 1, in the WAN of the LTE, the RRME includes an enhanced Node B (eNB) and a Home enhanced Node B (HeNB), and preferably, may further include an HeNB GateWay (HeNB GW). The eNB may be directly connected with a Mobility Management Entity (MME) in a Core Network (CN). When the RRME includes the HeNB GW, the HeNB may be connected with the MME through the HeNB GW. When the RRME fails to include the HeNB GW, the HeNB may be directly connected with the MME.

In prior scheme, a subscriber of HeNB may only be able to access a home network with the HeNB to which the subscriber belongs. A subscriber cannot remotely access a home network of an HeNB, to which the subscriber belongs, when the HeNB is not used or when the subscriber is roaming.

However, prior art fails to provide corresponding solution, when a subscriber possesses desire and requirements for remotely accessing a home network of an HeNB, to which the subscriber belongs.

DISCLOSURE OF INVENTION

Technical Problem

Embodiments of the invention mainly provide a method for remotely accessing, which enables a subscriber to remotely access a home network, even if the subscriber is not in the home network.

Embodiments of the invention also provide a system for remotely accessing, which enables a subscriber to remotely access a home network, even if the subscriber is not in the home network.

Solution to Problem

To achieve the above objectives, the technical solution of the invention is implemented as follows.

Embodiments of the invention provide a method for remotely accessing, which includes:

receiving, by a mobility management device, a remote access requesting message sent by User Equipment (UE), wherein the remote access requesting message comprises UE identifier, type identifier of a service for remotely accessing a home network and identifier of a home base station;

querying, by the mobility management device, according to contents in the remote access requesting message, to determine whether the UE possesses right for accessing the home network under the control of the home base station, when determining the UE possesses the right, selecting, by the mobility management device, a GateWay (GW) device, and sending the contents in the remote access requesting message to the GW device; or selecting a GW device by the mobility management device firstly, sending the contents in the remote access requesting message to the GW device, and determining, by the GW device, whether the UE possesses the right for accessing the home network under the control of the home base station currently accessed by the UE;

when determining the UE possesses the right for accessing the home network under the control of the home base station, searching in an Access Control List (ACL) sever by the GW device according to the identifier of the home base station, to obtain scope of available IP address for the home network under the control of the home base station, and allocating an IP address for the UE according to the scope of available IP address;

sending, by the GW device, the allocated IP address to the UE, to enable the UE to remotely access the home network under the control of the home base station according to the allocated IP address.

Embodiments of the invention also provide a system for remotely accessing, which includes a mobility management device, a GateWay (GW) device and an Access Control List (ACL) server, in which the mobility management device is configured to receive a remote access requesting message sent by User Equipment (UE), wherein the remote access requesting message comprises UE identifier, type identifier of a service for remotely accessing a home network and identifier of a home base station;

the mobility management device is further configured to query according to contents in the remote access requesting message, to determine whether the UE possesses right for accessing the home network under the control of the home base station, when determining the UE possesses the right, select a GateWay (GW) device, and send the contents in the remote access requesting message to the GW device; or the mobility management device is configured to select a GW device at first, send the contents in the remote access requesting message to the GW device, and the GW device is configured to determine whether the UE possesses the right for accessing the home network under the control of the home base station accessed by the UE;

the GW device, when determining the right for accessing the home network under the control of the home base station is possessed, is configured to search the ACL server according to the identifier of the home base station, to obtain scope of available IP address for the home network under the control of the home base station, and allocate an IP address for the UE according to the scope of available IP address;

the GW device is further configured to send the allocated IP address to the UE, to enable the UE to remotely access the home network under the control of the home base station according to the allocated IP address.

From the above technical solution, it can be seen that the mobility management device in the embodiments of the invention may receive a remote access requesting message sent by User Equipment (UE); the mobility management device queries according to contents in the remote access requesting message, to determine whether the UE possesses right for accessing a home network of a home base station, if determining the UE possesses the right, selects a gateway device, and sends the contents in the remote access requesting message to the gateway device; or, the mobility management device selects a gateway device firstly, sends the contents in the remote access requesting message to the gateway device, and then the gateway device determines whether the UE possesses right to access the home network of the home base station currently accessed by the UE; when determining the UE possesses the right to access the home network of the home base station, the gateway device queries the ACL server according to identifier of the home base station, to obtain scope of available IP addresses of the home network under the control of the home base station, and allocates an IP address for the UE according to the scope of available IP addresses; the gateway device sends the allocated IP address to the UE, to enable the UE to remotely access the home network of the home base station with the allocated IP address.

Advantageous Effects of Invention

The above technical solution enables the subscriber to remotely access the home network, even if the subscriber is not in the home network.

MODE FOR THE INVENTION

The core idea of the invention is as follows. An Access Control List (ACL) server is added to a network, in which the ACL server includes at least an Internet Protocol (IP) address of a home base station and available IP addresses of a home network under the control of the home base station. Contents included in the ACL may also be stored in prior network element node, for example, the contents may be stored in a Mobile Management Entity (MME) or Home Subscriber Server (HSS) in a Long Term Evolution (LTE) system, or may be stored in a Serving General Packet Radio Service (GPRS) Supporting Node (SGSN) or the HSS in a Third Generation (3G) system. User Equipment (UE) sends a remote access requesting message to a mobility management device, the mobility management device performs access control for the UE according to request of the UE, and selects an appropriate gateway device for the UE, the gateway device allocates an IP address for the UE from the same address pool of the home base station. Or, after receiving the remote access requesting message sent by the UE, the mobility management device selects an appropriate gateway device for the UE firstly, and then the gateway device completes the access control and IP address allocation for the UE.

Figure 1:
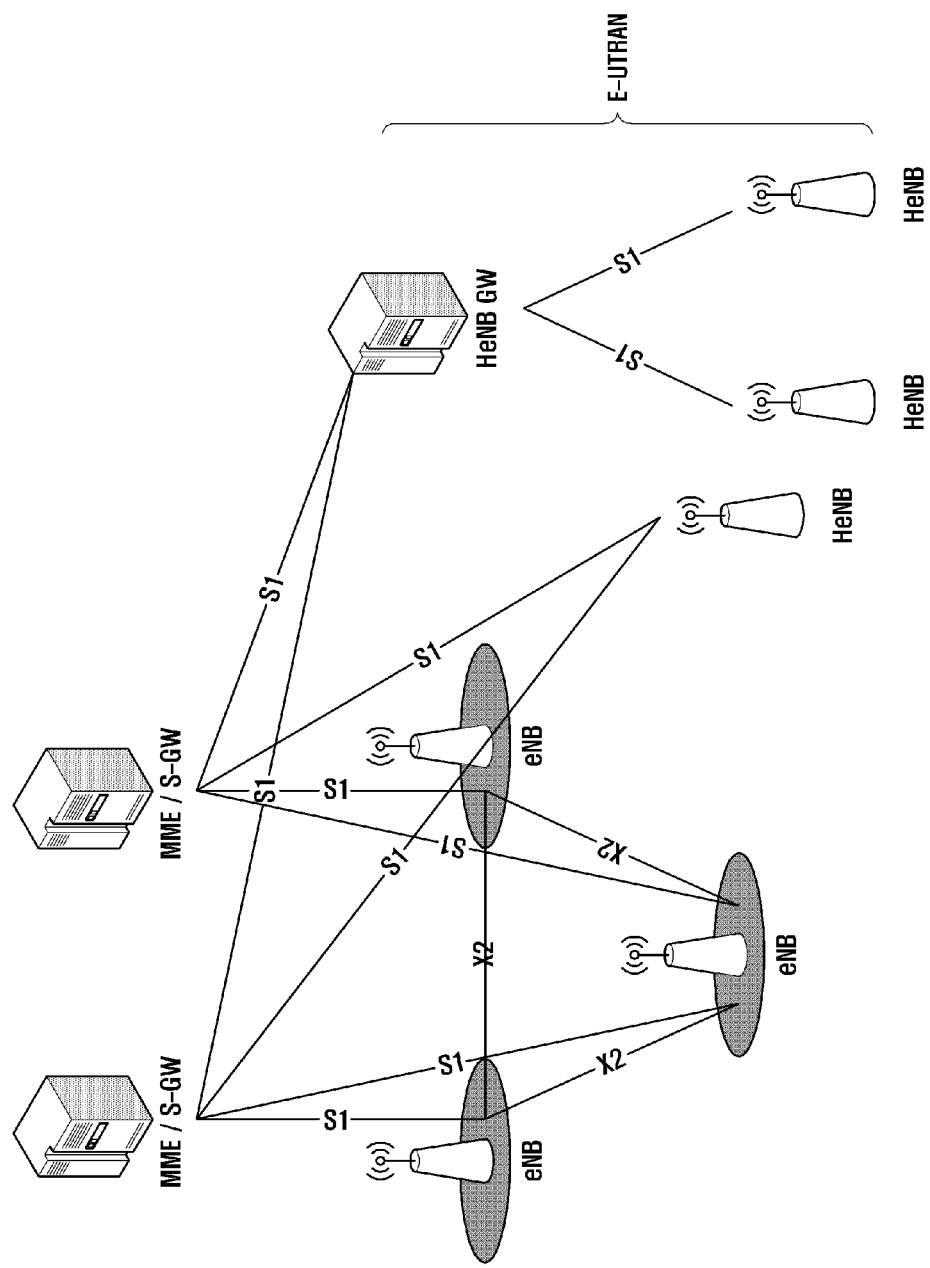
FIG. 1 is a schematic diagram illustrating structure of an LTE system in the prior art.
Figure 2:
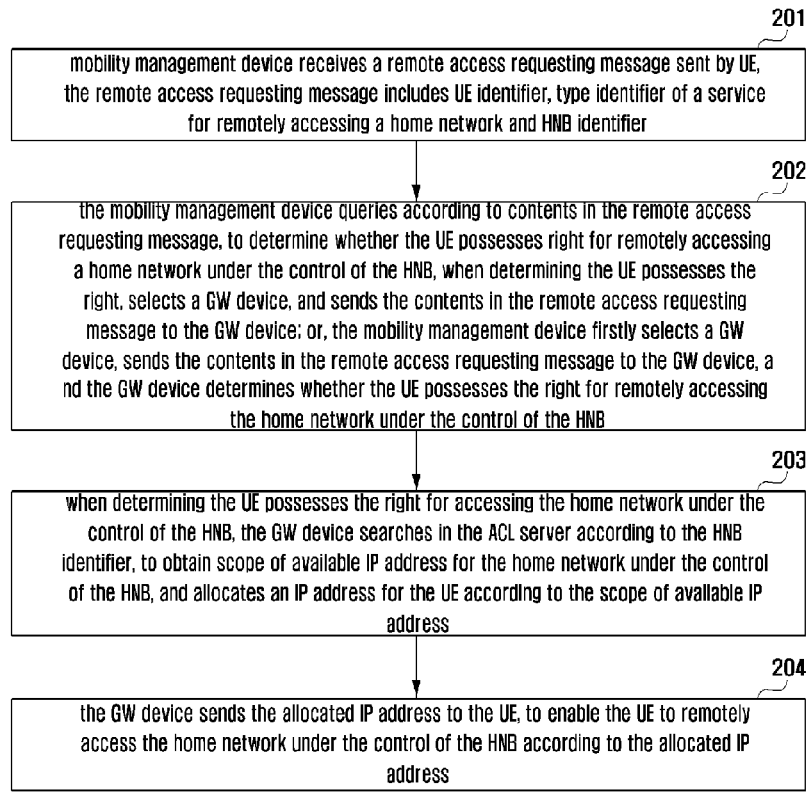
FIG. 2 is a flow chart illustrating a method for remotely accessing in accordance with an embodiment of the invention.

FIG. 2 is a flow chart illustrating a method for remotely accessing in accordance with an embodiment of the invention. As shown in FIG. 2, the method includes the following.

Block 201, a mobility management device receives a remote access requesting message sent by UE, the remote access requesting message includes UE identifier, type identifier of a service for remotely accessing a home network, and identifier of a home base station.

Block 202, the mobility management device queries according to contents in the remote access requesting message, and determines whether the UE possesses right for accessing a home network under the control of a home base station, when determining the UE possesses the right, selects a gateway device, and sends the contents in the remote access requesting message to the gateway device; or, the mobility management device selects a gateway device at first, and then sends the contents in the remote access requesting message to the gateway device, subsequently, the gateway device determines whether the UE possesses the right for accessing the home network under the control of the home base station currently accessed by the UE.

Block 203, when determining the UE possesses the right for accessing the home network under the control of the home base station, the gateway device queries the ACL server according to the identifier of the home base station, to obtain scope of available IP addresses of the home network under the control of the home base station, and allocates an IP address for the UE according to the scope of available IP addresses.

Block 204, the gateway device sends the allocated IP address to the UE, to enable the UE to remotely access the home network under the control of the home base station with the allocated IP address.

By adopting the method illustrated in FIG. 2, a subscriber may be enabled to remotely access a home network and to communicate with devices in the home network, even if the subscriber is not in the home network, or even the subscriber is in network of other operators.

To make objectives, technical solution and advantages of the invention clearer, detailed descriptions about the invention are further provided in the following accompanying with figures and embodiments. In the following embodiment, an LTE network is taken for an example, that is, an example is given, in which a mobility management device is an MME, a gateway device is a Public Data Network Gateway (PDN-GW), and a home base station is a Home enhanced Node B (HeNB). However, it should be noted that, in a 3G network, the mobility management device is a Serving GPRS Supporting Node (SGSN), the gateway device is a Gateway GPRS Supporting Node (GGSN), the home base station is a Home Node B (HNB). In the industry, the HeNB and the HNB are referred to as home base station uniformly.

For convenience, several scenes involved in embodiments of the invention are provided at first.

Scene 1: UE is under the control of an HeNB, the UE and the HeNB are located in one Public Land Mobile Network (PLMN), that is, non-roaming scene. And the UE accesses a network through other HeNB or eNB.

Figure 3:
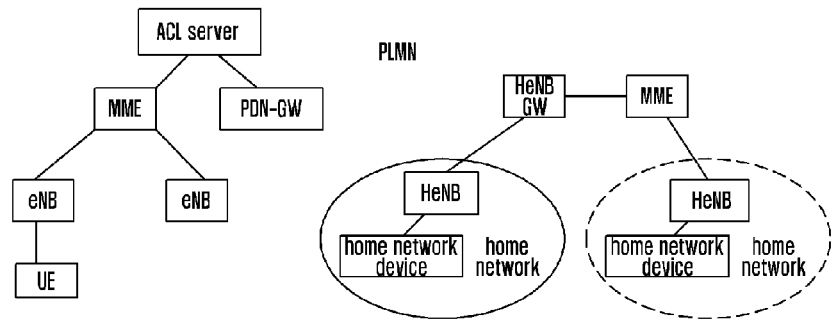
FIG. 3 is a schematic diagram illustrating networking of scene 1 in accordance with an embodiment of the invention.

FIG. 3 is a schematic diagram illustrating networking of scene 1 in accordance with an embodiment of the invention. As shown in FIG. 3, UE is under the control of an HeNB, and the HeNB connects with an MME through an HeNB GW. Or, when there is no HeNB GW, the HeNB directly connects with the MME. This case is illustrated with dashed circle in FIG. 3.

Scene 2: UE is under the control of an HeNB, the UE currently roams to other PLMN and requests to access the HeNB to which the UE belongs. The PLMN, in which the UE is roaming, is referred to as Visited PLMN (VPLMN). Another PLMN, to which the UE belongs, is referred to as Home PLMN (HPLMN). There is a roaming protocol between the VPLMN and the HPLMN.

Figure 4:
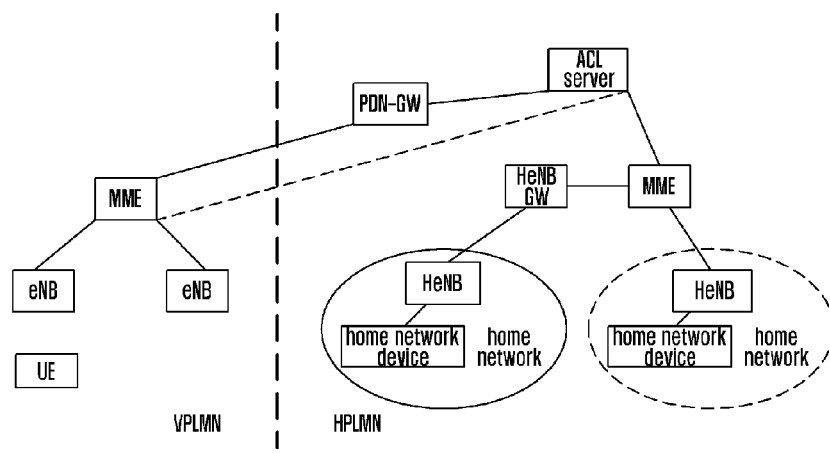
FIG. 4 is a schematic diagram illustrating networking of scene 2 in accordance with an embodiment of the invention.
Figure 5:
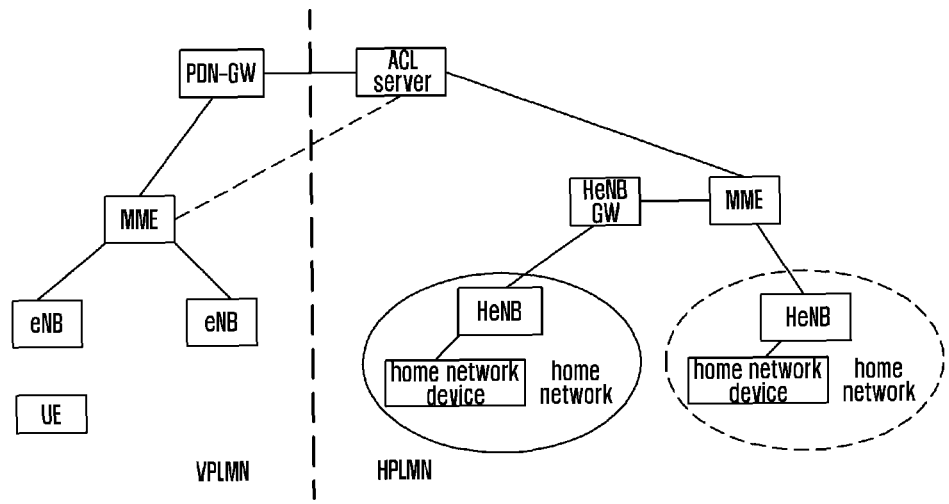
FIG. 5 is a schematic diagram illustrating another networking of scene 2 in accordance with an embodiment of the invention.

FIG. 4 is a schematic diagram illustrating networking in scene 2 in accordance with an embodiment of the invention. FIG. 5 is a schematic diagram illustrating another networking in scene 2 in accordance with an embodiment of the invention. As shown in FIGS. 4 and 5, the UE initiates a request for remotely accessing its HeNB after roaming to the VPLMN. The difference between FIG. 4 and FIG. 5 is as follows. In FIG. 4, the PDN-GW selected by the MME for the UE is a PDN-GW in the HPLMN of the UE. While in FIG. 5, the PDN-GW selected by the MME for the UE is a PDN-GW in the VPLMN of the UE.

Scene 3: UE is not under the control of the HeNB, that is, the UE is not a subscriber of a home network under the control of the HeNB. Subscription information of the UE fails to include the HeNB. However, when the HeNB allows UE outside the home network to access, the scheme of the invention may enable the UE to remotely access the HeNB.

Figure 6:
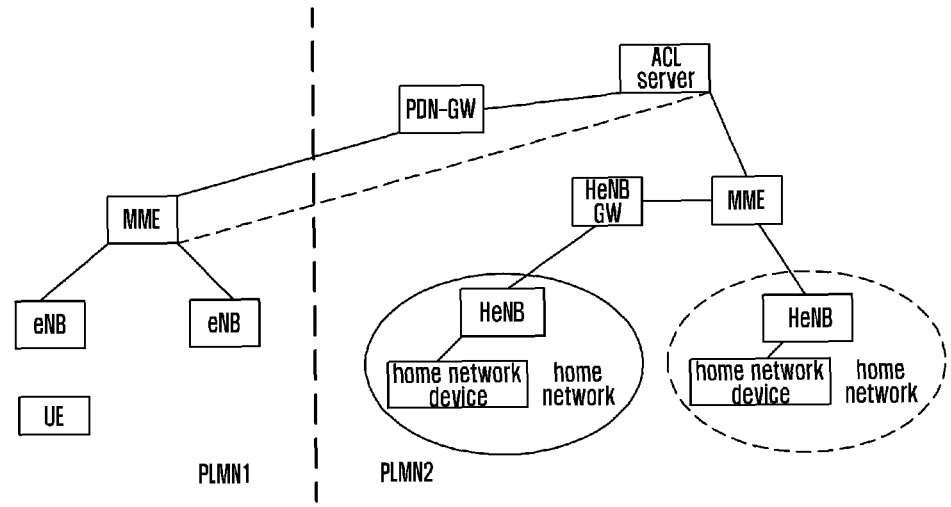
FIG. 6 is a schematic diagram illustrating networking of scene 3 in accordance with an embodiment of the invention.
Figure 7:
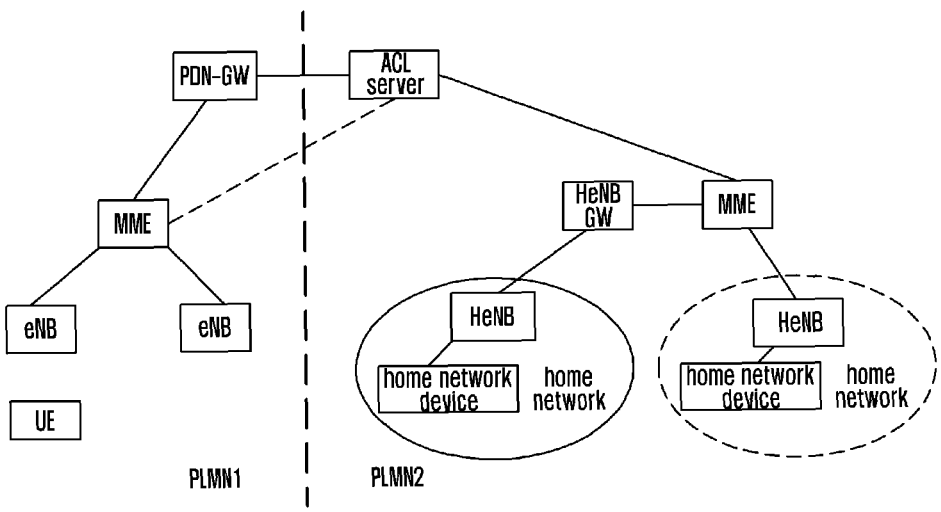
FIG. 7 is a schematic diagram illustrating another networking of scene 3 in accordance with an embodiment of the invention.

FIG. 6 is a schematic diagram illustrating networking in scene 3 in accordance with an embodiment of the invention. FIG. 7 is a schematic diagram illustrating another networking in scene 3 in accordance with an embodiment of the invention. As shown in FIGS. 6 and 7, the UE, which is in its HPLMN, initiates a request for remotely accessing an HeNB to which the UE not belongs. The difference between FIG. 6 and FIG. 7 is as follows. In FIG. 6, the PDN-GW selected by the MME for the UE is a PDN-GW in PLMN2 to which the HeNB belongs. While in FIG. 7, the PDN-GW selected by the MME for the UE is a PDN-GW in PLMN1 to which the UE belongs Descriptions about scheme of the invention are provided in the following based on the above three scenes.

To achieve the invention, it is necessary to add an ACL server to core-network side at first. The ACL server may be a network element device newly added in the network, or may be integrated with existed HSS, or MME, or SGSN into one physical device, that is, corresponding information in the ACL server may be stored in existed HSS/MME/SGSN. In the embodiments of the invention, logical functions of the ACL server are mainly discussed, instead of limiting practical location of the physical entity thereof. Implementation of the invention will not be affected by the practical location of the ACL server.

In the embodiments of the invention, functions of the ACL server are mainly to store the following information.

a) an HeNB list, including identifiers of all the HeNBs, which may be accessed by each subscribed UE in the PLMN where the ACL server located;

b) name of device, which may be accessed in a home network under the control of each HeNB in the PLMN where the ACL server located;

c) available IP address of the home network under the control of each HeNB in the PLMN where the ACL server located, and IP address of the access device;

To support scene 3, the ACL sever further needs to store the following.

d) an HeNB list, including identifiers of all the HeNBs, which may be accessed by each non-subscribed UE in the PLMN where the ACL server located.

The information stored in the ACL server may facilitate a core network device to perform access control judgment for a service request initiated by the UE for remotely accessing a home network, and may facilitate IP address allocation. In scene 1, the UE, the HeNB and the ACL server are located in one PLMN. In scene 2 supporting UE roaming, the ACL server is located in the HPLMN of the UE. In scene 3, if the UE and the HeNB belong to different PLMNs, the ACL server is located in the PLMN to which the HeNB belongs.

Figure 8:
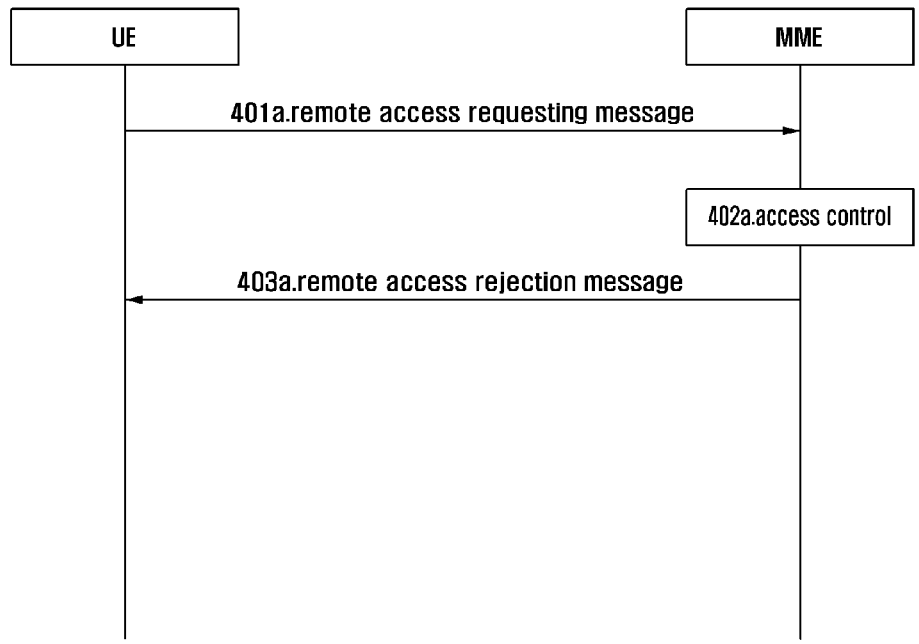
FIG. 8 is a schematic diagram illustrating an access control flow in a service for remotely accessing a home network in accordance with an embodiment of the invention.
Figure 9:
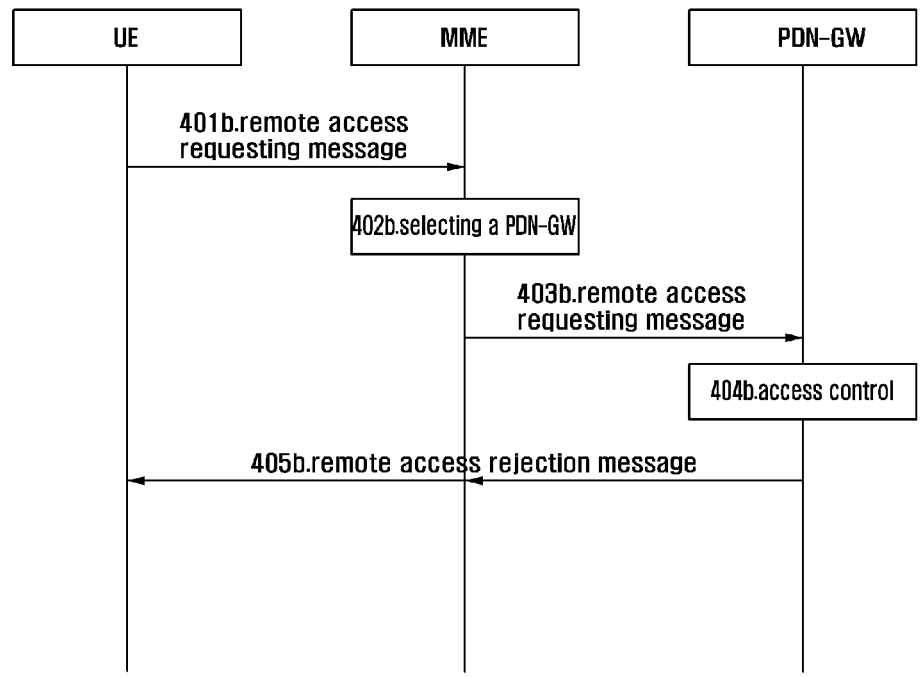
FIG. 9 is a schematic diagram illustrating an access control flow in a service for remotely accessing a home network in accordance with another embodiment of the invention.

FIG. 8 is a schematic diagram illustrating an access control flow in a service for remotely accessing a home network in accordance with an embodiment of the invention. As shown in FIG. 9, the following blocks are included.

Block 401a, UE initiates a remote access requesting message to an MME.

In the block, the remote access requesting message initiated by the UE may be a PDN connection establishment requesting message, or a service requesting message, or a bear establishment requesting message.

In the block, contents carried by the remote access requesting message at least includes UE identifier, type identifier of a service for remotely accessing a home network and HeNB identifier. The type identifier of the service for remotely accessing the home network demonstrates that currently requested service is a service for remotely accessing a home network. Type identifier of the service for remotely accessing the home network and the HeNB identifier may be bound, or may be independent parameters. For example, the type identifier of the service for remotely accessing the home network may include HeNB identifier, and the HeNB identifier may be HeNB Identity (HeNB ID) or HeNB name, etc. And then, after receiving the parameter, the MME may identify the HeNB which the UE needs to remotely access. The type identifier of the service for remotely accessing the home network may extend Access Point Name (APN) parameter, to make the APN parameter include the HeNB identifier. That is, the APN and the HeNB identifier may correspond to each other. Or, to make the APN include the type identifier of the service for remotely accessing.

Block 402a, after receiving the remote access requesting message, the MME performs access control on the UE. That is, to determine whether the UE possesses right for accessing the requested HeNB. If determining the UE possesses the right for accessing the requested HeNB, proceeding to subsequent flow. Otherwise, proceeding to block 403a.

In the block, when determining whether the UE possesses the right for accessing the requested HeNB, the executed subsequent flow is as follows. An appropriate PDN-GW is selected for the UE. The PDN-GW allocates an IP address for the UE from the same IP address pool of the HeNB's IP address.

Block 403a, the MME returns a remote access rejection message to the UE, which carries the reason for rejection.

From FIG. 8, it can be seen that after receiving the remote access requesting message from the UE, the MME performs the access control for the UE. In other embodiments of the invention, after receiving the remote access requesting message from the UE, the MME may select a PDN-GW for the UE. And then the PDN-GW performs the access control for the UE. When determining the UE fails to possess the right for accessing the HeNB, the PDN-GW returns a remote access rejection message to the UE, which carries the reason for rejection, as shown in FIG. 9.

FIG. 9 is a schematic diagram illustrating an access control flow in a service for remotely accessing a home network in accordance with another embodiment of the invention. As shown in FIG. 9, the following blocks are included.

Block 401b, UE initiates a remote access requesting message to an MME.

Block 402b, the MME selects an appropriate PDN-GW for the UE.

Block 403b, the MME sends the remote access requesting message to the selected PDN-GW.

Block 404b, after receiving the remote access requesting message, the PDN-GW performs the access control on the UE, that is, determines whether the UE possesses the right for accessing the requested HeNB, when determining the UE possesses the right for accessing the requested HeNB, proceeding to subsequent flow; otherwise, proceeding to block 405b.

Block 405b, the PDN-GW returns a remote access rejection message to the UE, which carries the reason for rejection.

Figure 10:
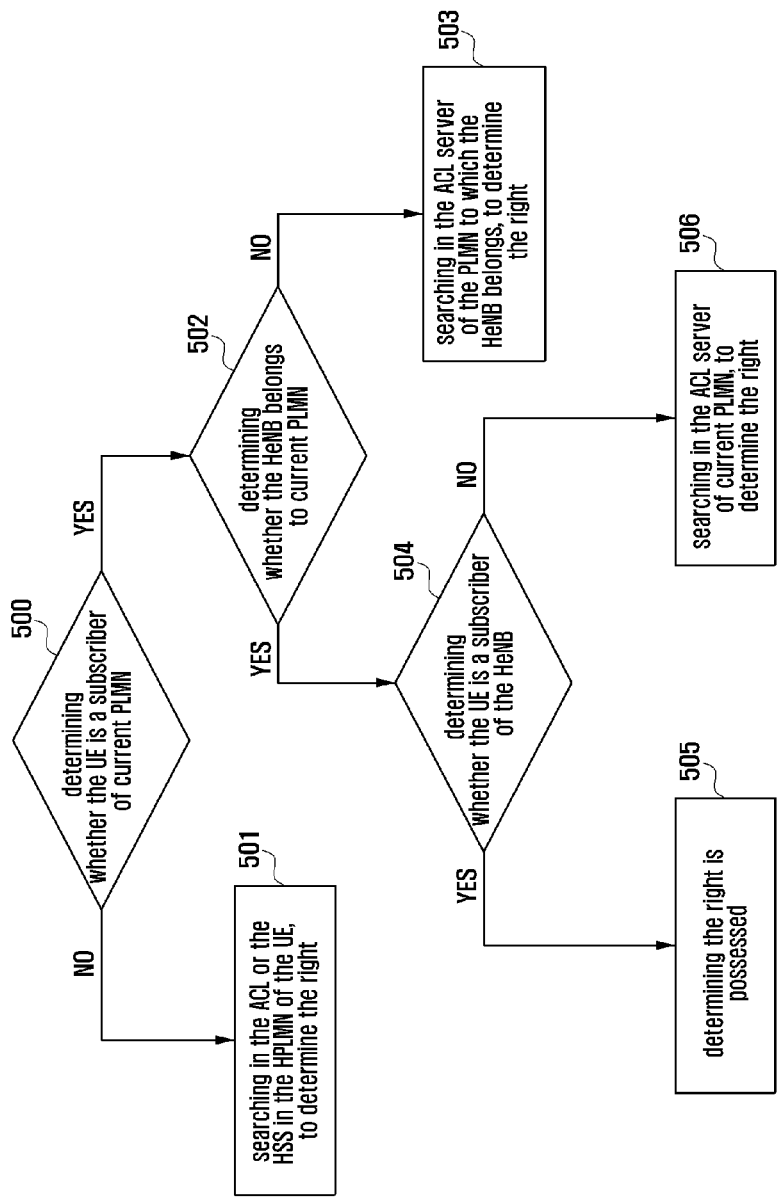
FIG. 10 is a specific flowchart illustrating access control performed by an MME on UE in accordance with an embodiment of the invention.

The specific process for performing the access control on the UE in block 402 shown in above FIG. 8 is illustrated in FIG. 10.

FIG. 10 is a specific flowchart illustrating access control performed by an MME on UE in accordance with an embodiment of the invention. As shown in FIG. 10, the following blocks are included.

Block 500, the MME determines whether the UE is a subscriber of a PLMN currently accessed by the UE according to the UE identifier, if yes, proceeding to block 502; otherwise, proceeding to block 501.

In the block, the UE identifier is International Mobile Subscriber Identity (IMSI) or S-Temporary Mobile Subscriber Identity (S-TMSI), etc. The PLMN currently accessed by the UE is the PLMN where the UE currently located.

Block 501, the UE doesn't belong to current PLMN, that is, the UE is roaming, the MME searches for the UE's subscription information in the ACL server or the HSS in the UE's HPLMN, and determines whether the UE possesses the right for accessing the HeNB according to the UE's subscription information. The flow is terminated.

Here, the right for accessing the HeNB refers to the right for accessing a home network under the control of the HeNB, which applies in the following.

In the block, if the UE's subscription information includes information about an HeNB which the UE requests to access, the UE is determined to possess the right for accessing the HeNB which the UE requests to access. Otherwise, the UE is determined not to possess the right for accessing the HeNB which the UE requests to access.

In the block, the MME may obtain the UE's subscription information with existed mode. Since the ACL server also includes some of the UE's subscription information, e.g., an HeNB list including identifiers of all the HeNBs which may be accessed by the UE, the MME may obtain the UE's subscription information from the ACL server.

The block actually corresponds to the case, in which the UE is roaming, described in scene 2.

Block 502, the UE belongs to current PLMN, that is, the UE is in a non-roaming state. The MME determines whether the HeNB belongs to current PLMN according to the HeNB identifier in the remote access requesting message, if yes, proceeding to block 504; otherwise, proceeding to block 503.

Block 503, the UE belongs to current PLMN, however the HeNB doesn't belong to current PLMN. The MME searches in the ACL server in the PLMN to which the HeNB belongs, and determines whether the UE possesses the right for accessing the HeNB according to searching result. The flow is terminated.

The block actually corresponds to above mentioned scene 3, which are both about the case in which the UE and the HeNB locate in different PLMNs. For example, a subscriber's home network is in PLMN1, while the subscriber's working place is in PLMN2, and the subscriber uses UE2 at the working place in PLMN2 to request to access network devices in the home network, e.g., to access computer in the home network to download files.

In the block, the MME may deduce address of an ACL server in a network to which the HeNB belongs, according to the HeNB identifier or the APN information. The MME may deduce the address of the ACL server in the following way. According to APN-OI, the MME searches for the address of the ACL server in a Dynamic Host Configuration Protocol (DHCP) server in a network to which the HeNB belongs.

In the block, the MME may determine whether the UE possesses the right for accessing the HeNB, according to "an HeNB list, including identifiers of all the HeNBs which may be accessed by each non-subscribed UE in the PLMN where the ACL server located" stored in the ACL server.

Block 504, when both the UE and the HeNB belong to current network, the MME determines whether the UE is a subscriber of the HeNB which the UE requests to access, according to the UE's subscription information, if yes, proceeding to block 505; otherwise, proceeding to block 506.

Block 505, when the UE is a subscriber of the HeNB, the MME determines the UE possesses the right for accessing the HeNB. The flow is terminated.

The block actually corresponds to above mentioned scene 1.

Block 506, the MME searches in the ACL server in current PLMN, and determines whether the UE possesses the right for accessing the HeNB according to searching result. The flow is terminated.

In the block, the MME may determine whether the UE possesses the right for accessing the HeNB, according to "an HeNB list, including identifiers of all the HeNBs which may be accessed by each non-subscribed UE in the PLMN where the ACL server located" stored in the ACL server.

With reference to FIG. 10, the MME may select a PDN-GW for the UE before block 501 (that is, after the MME determining the UE doesn't belong to current PLMN), and send contents in the remote access requesting message to the PDN-GW. Subsequently, the PDN-GW completes block 501, that is, the PDN-GW searches for the UE's subscription information in the ACL server or the HSS in the HPLMN of the UE, and determines whether the UE possesses the right for accessing the HeNB according to the UE's subscription information.

Or, the MME may select a PDN-GW for the UE before block 503 (that is, after the MME determining the UE belongs to current PLMN, and the HeNB doesn't belong to current PLMN), and send the contents in the remote access requesting message to the PDN-GW. Subsequently, the PDN-GW completes block 503. That is, the PDN-GW obtains the address of the ACL server in the PLMN to which the HeNB belongs, according to the HeNB identifier, and determines whether the UE possesses the right for accessing the home network under the control of the HeNB by searching the ACL server.

Or, the MME may select a PDN-GW for the UE before block 506 (that is, after the MME determining the UE belongs to current PLMN, the HeNB belongs to current PLMN, meanwhile the UE is not a subscriber of the HeNB), and send the contents in the remote access requesting message to the PDN-GW. Subsequently, the PDN-GW completes block 506. That is, the PDN-GW searches the ACL server in current PLMN, and determines whether the UE possesses the right for accessing the HeNB according to searching result.

Strategy adopted by the MME for selecting the PDN-GW is introduced in the following with FIG. 11.

Figure 11:
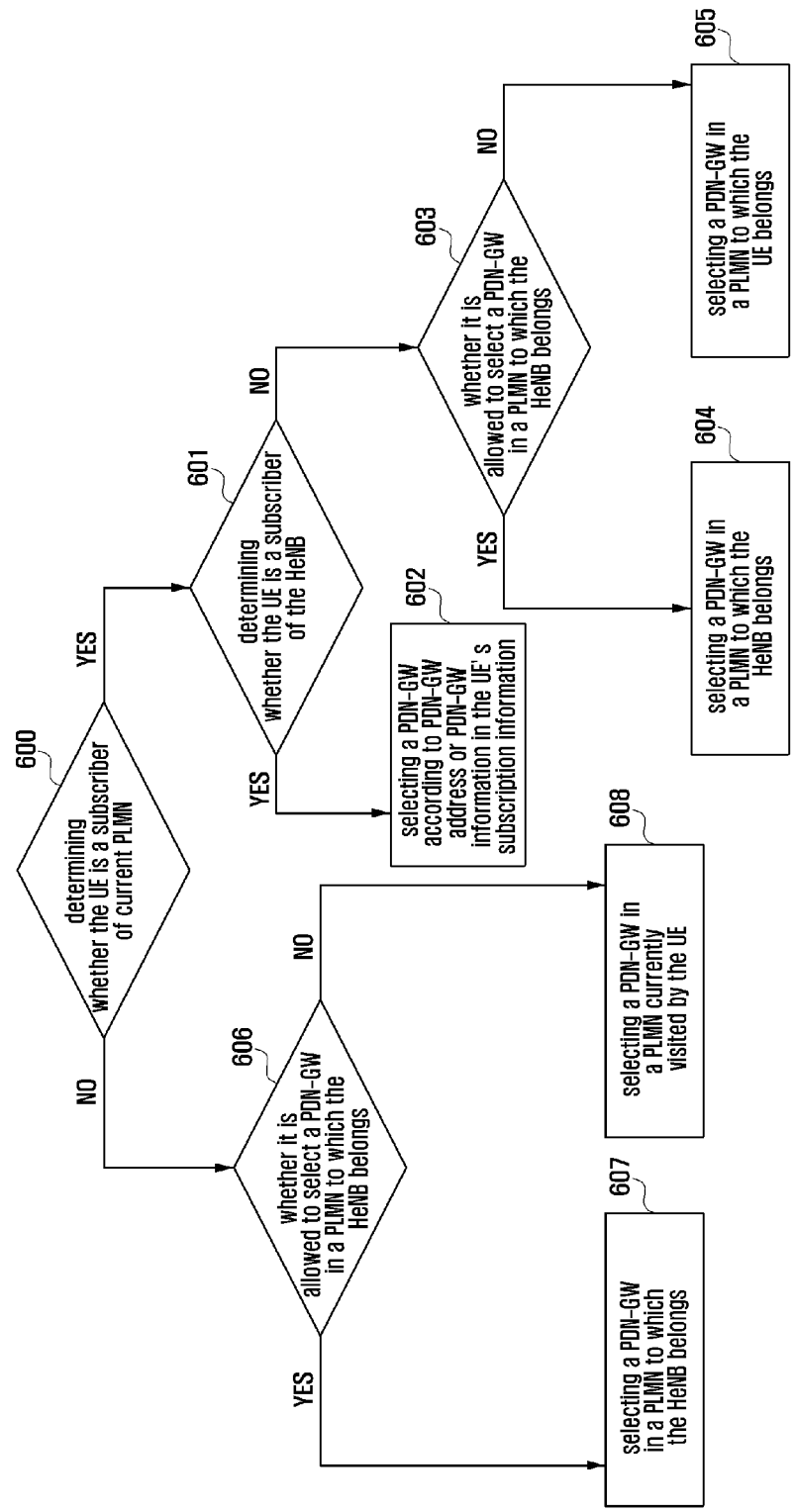
FIG. 11 is a flow chart illustrating selecting PDN-GW by an MME in accordance with an embodiment of the invention.

FIG. 11 is a flow chart illustrating selecting PDN-GW by an MME in accordance with an embodiment of the invention. As shown in FIG. 11, the following blocks are included.

Block 600, an MME determines whether UE is a subscriber of a PLMN currently accessed by the UE according to UE identifier, if yes, proceeding to block 601; otherwise, proceeding to block 606.

Block 601, the UE belongs to current PLMN. The MME determines whether the UE is a subscriber of an HeNB according to the UE's subscription information. If yes, proceeding to block 602; otherwise, proceeding to block 603.

Block 602, when the UE is a subscriber of the HeNB, the MME selects a PDN-GW for the UE according to prior art. That is, the MME selects a corresponding PDN-GW according to PDN-GW address or PDN-GW information in the UE's subscription information. The flow is terminated.

Block 603, when the UE is not a subscriber of the HeNB, the MME determines whether it is allowed to select a PDN-GW in a PLMN to which the HeNB belongs according to the UE's subscription information, if yes, proceeding to block 604; otherwise, proceeding to block 605.

In the block, if the UE's subscription information indicates that only the PDN-GW in the HPLMN of the UE may be accessed, proceeding to block 605. If the UE's subscription information indicates that the PDN-GW in a PLMN, to which the HeNB belongs, may be selected, or there is a roaming protocol between a PLMN, to which the HeNB belongs, and a PLMN, to which the UE belongs, proceeding to block 604.

Block 604, the MME selects a PDN-GW in the PLMN to which the HeNB belongs. The flow is terminated.

Block 605, the MME selects a PDN-GW in the PLMN to which the UE belongs. The flow is terminated.

Block 606, when the UE doesn't belong to current PLMN, the MME determines whether it is allowed to select a PDN-GW in the PLMN to which the HeNB belongs, according to the UE's subscription information, if yes, proceeding to block 607; otherwise, proceeding to block 608.

In the block, if the UE's subscription information indicates that only the PDN-GW in the HPLMN of the UE may be accessed, proceeding to block 607; if the UE's subscription information indicates that only the PDN-GW in the VPLMN of the UE may be accessed, proceeding to block 608; if the UE's subscription information indicates that the PDN-GW in the VPLMN of the UE may be accessed, which fails to forbid accessing the PDN-GW in the HPLMN, the MME may still select a PDN-GW in the HPLMN, that is, proceeding to block 607. Thus, the interaction among different operators may be reduced.

Block 607, the MME selects a PDN-GW in a PLMN to which the HeNB belongs (that is, the PDN-GW in the HPLMN of the UE). The flow is terminated.

In the block, if the UE's subscription information indicates that the PDN-GW in the VPLMN of the UE may be accessed, which fails to forbid accessing the PDN-GW in the HPLMN, the MME may still select a PDN-GW in the HPLMN for the remote access service, that is, proceeding to block 607. Thus, interaction among different operators may be reduced.

Block 608, the MME selects a PDN-GW in the current VPLMN of the UE. The flow is terminated.

No matter the MME selects a PDN-GW firstly, and then the selected PDN-GW completes the access control and the IP address allocation, or the MME performs the access control at first, and then selects a PDN-GW to allocate IP address. The strategy adopted by the MME for selecting is the same as the scheme shown in FIG. 11.

The whole flow for processing a service request for remotely accessing a home network by a network side is provided in the following accompanying with FIGS. 12 and 13, in which the MME completes the access control.

Figure 12:
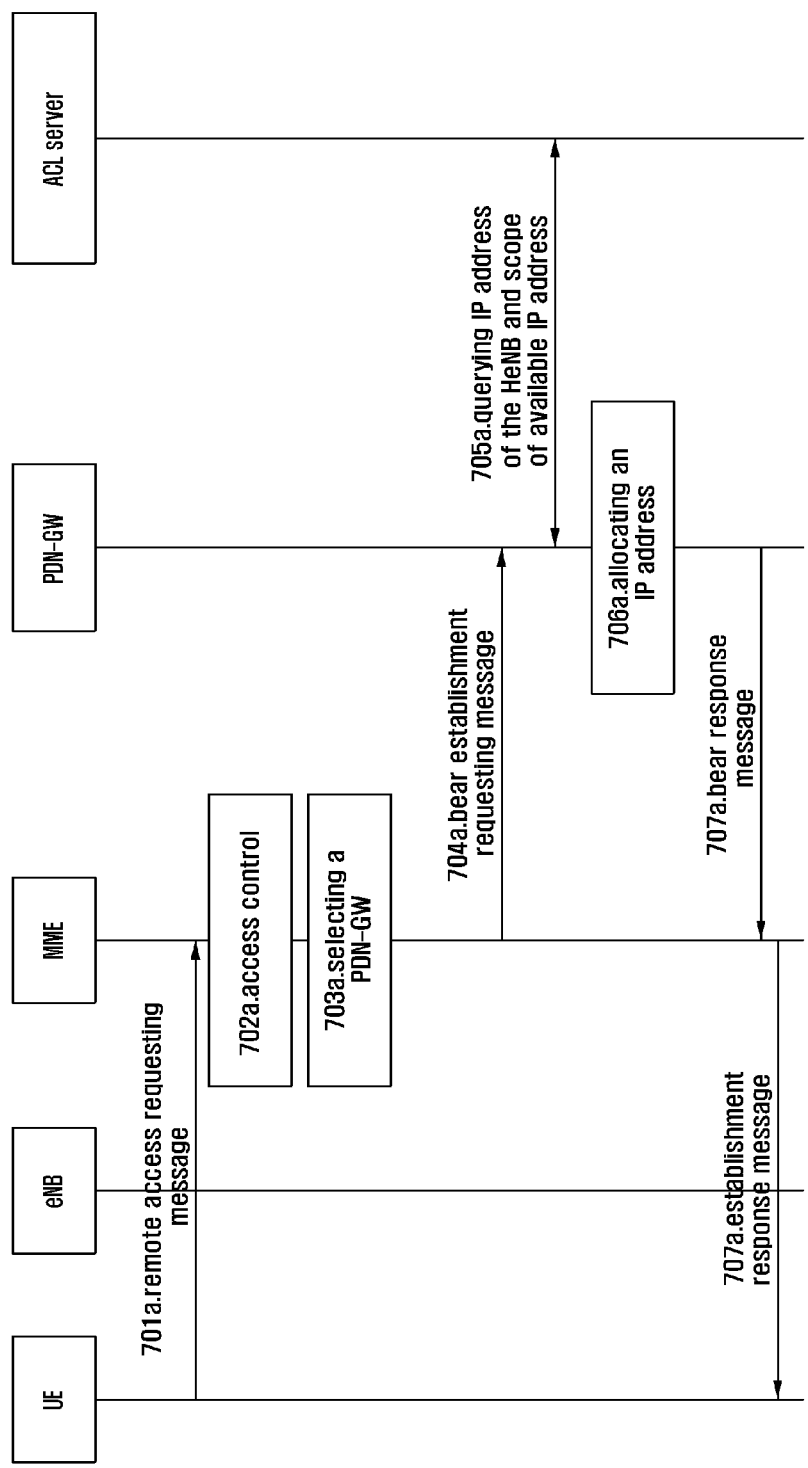
FIG. 12 is a flow chart illustrating processing a service request for remotely accessing a home network in accordance with an embodiment of the invention.

FIG. 12 is a flow chart illustrating processing a service request for remotely accessing a home network in accordance with an embodiment of the invention. As shown in FIG. 12, the following blocks are included.

Block 701a, UE initiates a remote access requesting message to an MME.

In the block, the remote access requesting message initiated by the UE may be a PDN connection establishment requesting message, or a service requesting message, or a bear establishment requesting message. Contents carried by the remote access requesting message at least include UE identifier, type identifier of a service for remotely accessing a home network and HeNB identifier.

Block 702a, the MME performs access control on the UE, that is, determines whether the UE possesses right for accessing an HeNB which the UE requests to access. When determining the UE possesses the right for accessing the HeNB which the UE requests to access, subsequent blocks will be executed.

The specific access control process performed by the MME in the block is shown in FIG. 10.

Block 703a, the MME selects a PDN-GW for the UE.

In the block, the way for selecting the PDN-GW by the MME is shown in FIG. 11.

Block 704a, the MME sends a bear establishment requesting message to the selected PDN-GW.

In the block, the bear establishment requesting message sent by the MME to the PDN-GW may carry the UE identifier, the type identifier of the service for remotely accessing the home network and the HeNB identifier. The type identifier of the service for remotely accessing the home network and the HeNB identifier may be bound to each other.

Block 705a, according to the HeNB identifier, the PDN-GW searches for an IP address corresponding to the HeNB and scope of available IP address in an ACL server of a PLMN, to which the HeNB belongs.

In the block, if the HeNB has been turned off, or there is something wrong in the HeNB, the PDN-GW may not be able to obtain scope of available IP address. And then, the PDN-GW returns a remote access rejection message to the UE, which carries the reason for rejection, that is, IP address cannot be allocated.

Block 706a, the PDN-GW allocates an IP address in the scope of available IP address for the UE, according to obtained scope of available IP address.

Block 707a, the PDN-GW sends the allocated IP address to the UE.

In the block, the PDN-GW sends a bear response message carrying the allocated IP address to the MME. And then, the MME sends an establishment response message carrying the allocated IP address to the UE.

Figure 13:
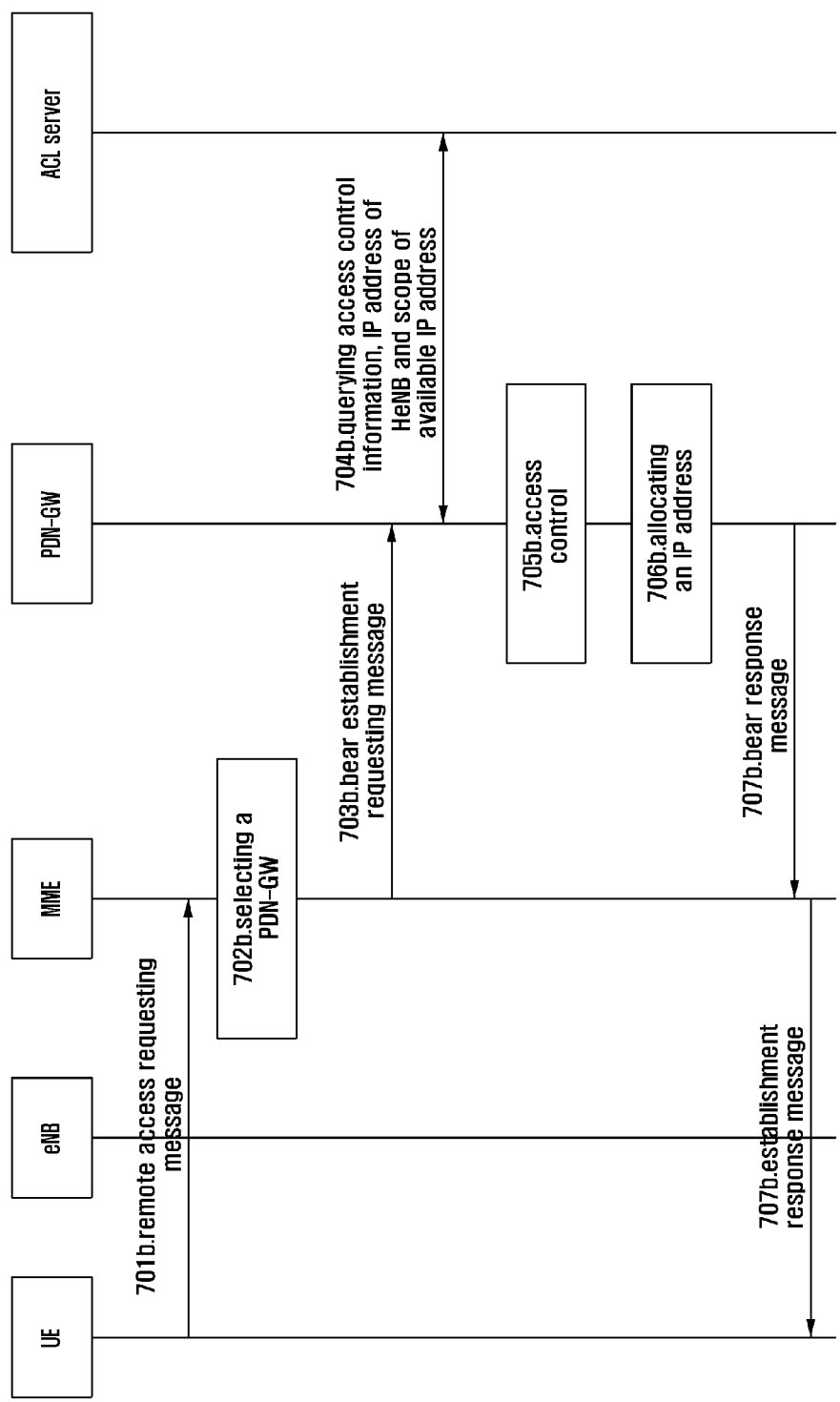
FIG. 13 is a flow chart illustrating processing a service request for remotely accessing a home network in accordance with an embodiment of the invention.

FIG. 13 is a flow chart illustrating processing a service request for remotely accessing a home network in accordance with an embodiment of the invention. As shown in FIG. 13, the following blocks are included.

Block 701b, UE sends a remote access requesting message to an MME.

Block 702b, the MME selects a PDN-GW for the UE.

In the block, the way for selecting the PDN-GW by the MME is shown in FIG. 11.

Block 703b, the MME sends a bear establishment requesting message to the selected PDN-GW.

In the block, the bear establishment requesting message sent by the MME to the PDN-GW carries UE identifier, type identifier of a service for remotely accessing a home network and HeNB identifier. The type identifier of the service for remotely accessing the home network and the HeNB identifier may be bound to each other.

Block 704b, the PDN-GW searches access control information, an IP address corresponding to the HeNB, and scope of available IP address in the ACL server.

In the block, the access control information searched by the PDN-GW in the ACL may be at least one piece of information, a), b) and d) stored in the ACL server Block 705b, the PDN-GW performs access control on the UE according to the access control information searched out, that is, determines whether the UE possesses the right for accessing an HeNB which the UE requests to access. When determining the UE possesses the right for accessing the HeNB which the UE requests to access, subsequent blocks may be executed.

Block 706b, the PDN-GW allocates an IP address in the scope of available IP address for the UE, according to obtained scope of available IP address.

Block 707b, the PDN-GW sends the allocated IP address to the UE.

In the block, the PDN-GW sends a bear response message carrying the allocated IP address to the MME. And then, the MME sends an establishment response message carrying the allocated IP address to the UE.

Above mentioned ACL server stores the following information. a) an HeNB list, including identifiers of all the HeNBs, which may be accessed by each subscribed UE in a PLMN where the ACL server located; b) name of each device, which may be accessed in a home network under the control of each HeNB in the PLMN where the ACL server located; c) available IP address of a home network under the control of each HeNB in the PLMN where the ACL server located, and IP address of access device thereof; d) an HeNB list, including identifiers of all the HeNBs, which may be accessed by each non-subscribed UE in the PLMN where the ACL server located. a) is stored in the HSS. b) and d) may be preset in the HSS by operator maintainer, and then be sent by the HSS to the ACL server. Or, b) and d) may be preset in the ACL server. c) may be reported to the ACL server during the process of start-up and registration of the HeNB. The specific process is shown in FIG. 14.

Figure 14:
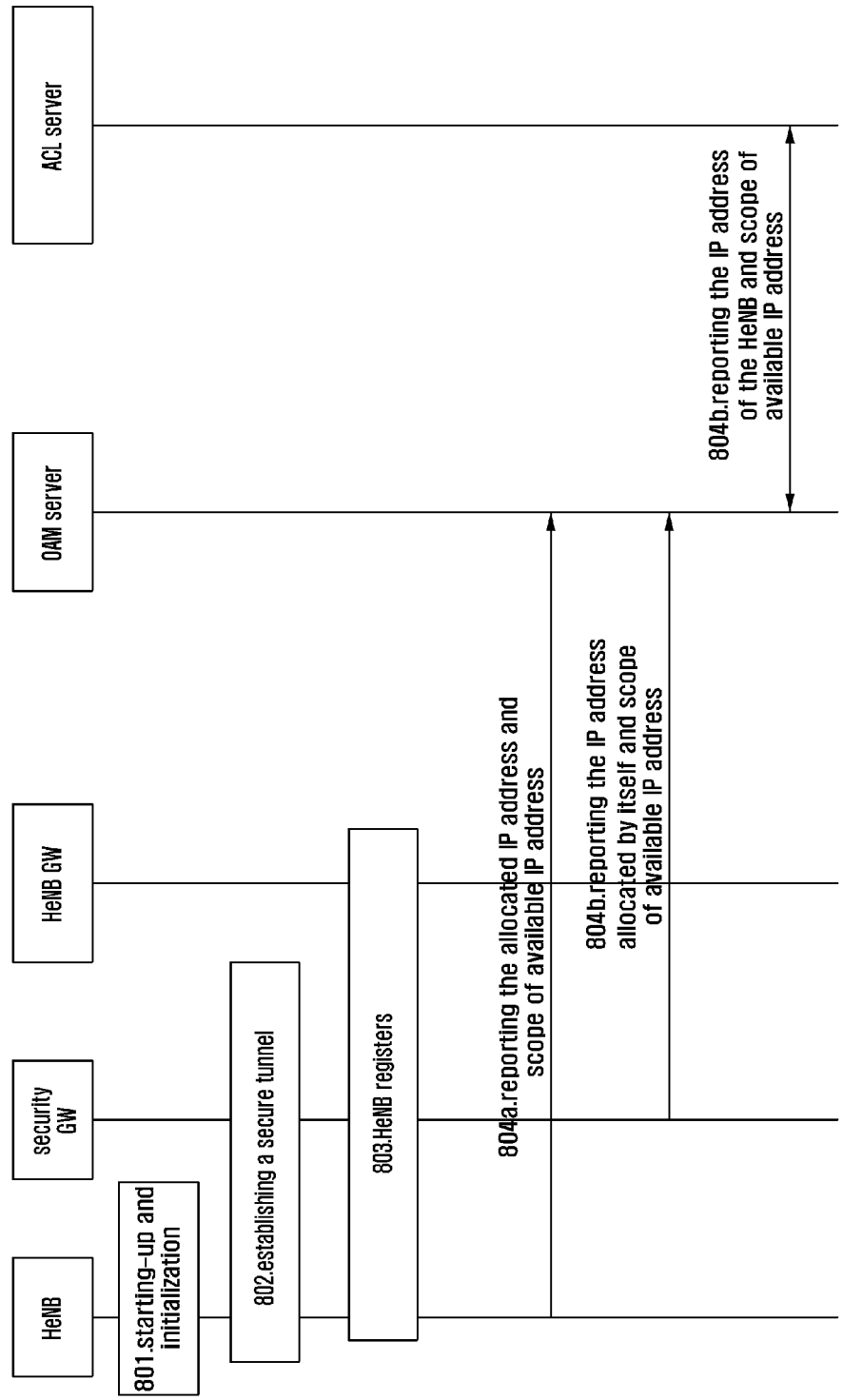
FIG. 14 is a flow chart illustrating starting up and registering by an HeNB in accordance with an embodiment of the invention.

FIG. 14 is a flow chart illustrating starting up and registering by an HeNB in accordance with an embodiment of the invention. As shown in FIG. 14, the following blocks are included.

Block 801, an HeNB starts up, and initializes.

Block 802, the HeNB establishes a secure tunnel with a security GW.

In the block, after authenticating the HeNB successfully, the security GW allocates an IP address from internal network and scope of available IP address. The IP address allocated for the HeNB and IP address in the scope of available IP address belong to the same address pool. Network entity outside the operator cannot access the HeNB.

Block 803, the HeNB registers.

In the block, the HeNB registers in the HeNB GW. In a scene without the HeNB GW deployed, the HeNB may directly register in the MME of the CN.

Block 804a, the HeNB reports the IP address allocated for it and scope of available IP address to an Operation Administration Maintenance (OAM) server;

Block 804b, or, the security GW reports the IP address allocated for the HeNB and scope of available IP address to the OAM server;

Only one of blocks 804a and 804b may be executed.

Block 805, the OAM server reports the IP address of the HeNB and scope of available IP address to the ACL server.

According to the scheme shown in FIG. 12 or 13, after obtaining the IP address by the UE which is allocated by the PDN-GW, how to communicate with devices in the home network according to the IP address is prior art. Brief descriptions are provided in the following taking FIGS. 15 and 16 as examples.

Figure 15:
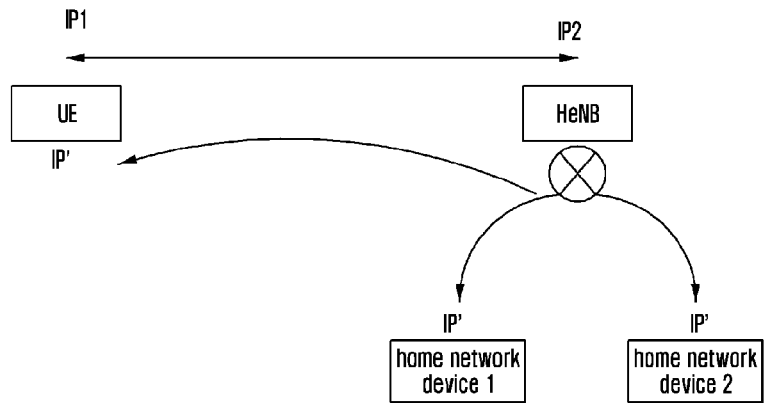
FIG. 15 is a schematic diagram illustrating communicating with an HeNB by UE, after the UE has been allocated with an IP address in accordance with an embodiment of the invention.

FIG. 15 is a schematic diagram illustrating communicating with an HeNB by UE, after the UE has been allocated with an IP address in accordance with an embodiment of the invention. As shown in FIG. 15, the IP address allocated by the PDN-GW for the UE according to scope of available IP address corresponding to the HeNB is IP1, the IP address allocated for the HeNB during registration process is IP2, and then the UE may directly communicate with remote HeNB. If the UE needs to communicate with devices in the home network under the control of the HeNB, when communication between the UE and the HeNB has been established, a router in the home network may allocate IP addresses in internal home network for the UE and other devices in the home network, e.g., the IP' shown in FIG. 15, and then the UE may be able to communicate with devices in the home network.

Figure 16:
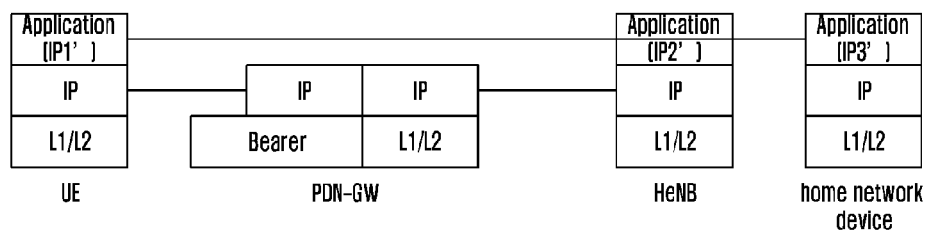
FIG. 16 is a schematic diagram illustrating a protocol stack of a user plane of communication between UE and home network device.

FIG. 16 is a schematic diagram illustrating a protocol stack of a user plane of communication between UE and home network device in accordance with an embodiment of the invention. As shown in FIG. 16, during the process of start-up and registration of the HeNB, after the HeNB has been admitted as a legal network device, the security GW allocates an IP address in a private network for the HeNB. The IP address belongs to internal network of operator. The UE requests to access remote service. After completing the UE's access control by the network, if the access control is successful, the PDN-GW may allocate an IP address for the UE according to obtained available IP address corresponding to the HeNB. This IP address and IP address in the HeNB's private network belong to one address pool. When the UE needs to communicate with devices in the home network, a router in the HeNB or a router in the home network may allocate IP addresses of application layer in the internal home network for the UE and home network devices, which are respectively IP1' and IP3'. FIG. 16 illustrates a data protocol stack of user plane from the UE to the home network devices, through the PDN-GW and the HeNB sequentially, after the remote access service having been activated. After a bear for the remote access service requested by the UE has been established by the network successfully, underlying network bear is transparent to remote access service. It is not necessary for the underlying layer to sense services transmitted in upper layers.

In the above embodiments, descriptions are provided with several examples, in which the mobility management device is MME, the GW device is PDN-GW. However, in a 3G network, the mobility management device is SGSN, the GW device is GGSN, the home base station is HNB. The 3G network still includes scenes same as the above mentioned 3 scenes. Descriptions are provided in the following with FIG. 10.

Figure 17:
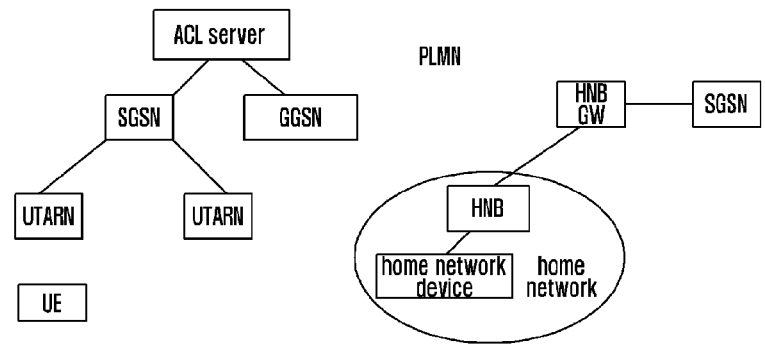
FIG. 17 is a schematic diagram illustrating networking of scene 1 in accordance with an embodiment of the invention.

FIG. 17 is a schematic diagram illustrating networking of scene 1 in accordance with an embodiment of the invention.

Figure 18:
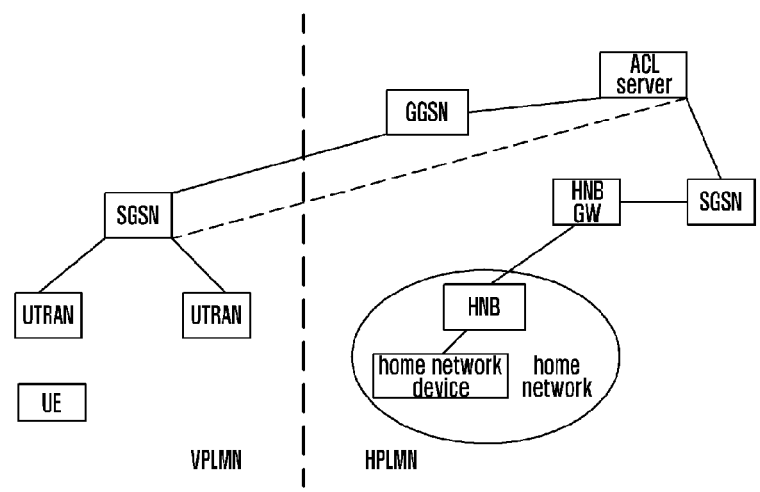
FIG. 18 is a schematic diagram illustrating networking of scene 2 in accordance with an embodiment of the invention.

FIG. 18 is a schematic diagram illustrating networking of scene 2 in accordance with an embodiment of the invention.

Figure 19:
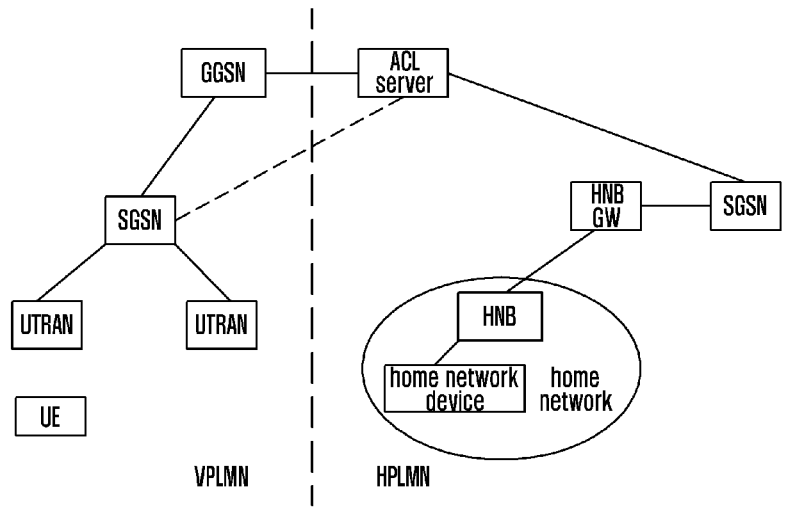
FIG. 19 is a schematic diagram illustrating another networking of scene 2 in accordance with an embodiment of the invention.

FIG. 19 is a schematic diagram illustrating another networking of scene 2 in accordance with an embodiment of the invention.

Figure 20:
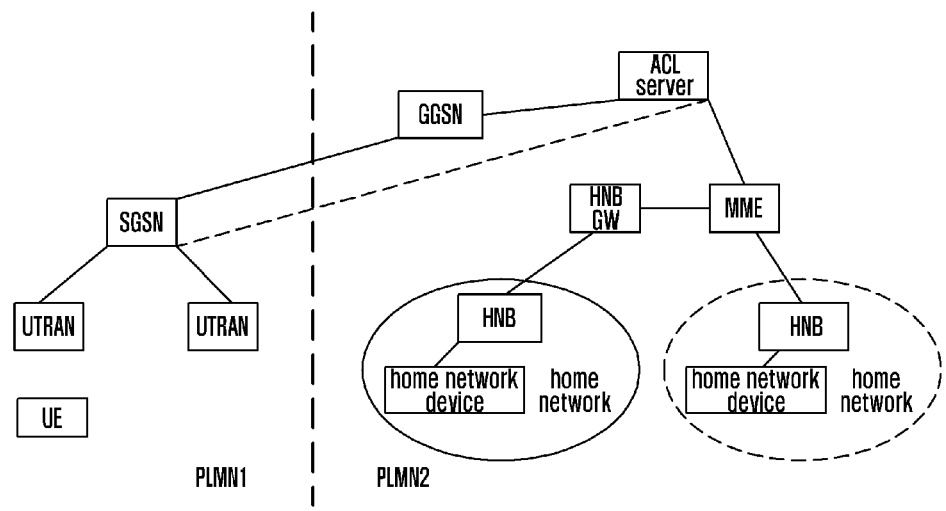
FIG. 20 is a schematic diagram illustrating networking of scene 3 in accordance with an embodiment of the invention.

FIG. 20 is a schematic diagram illustrating networking of scene 3 in accordance with an embodiment of the invention.

Figure 21:
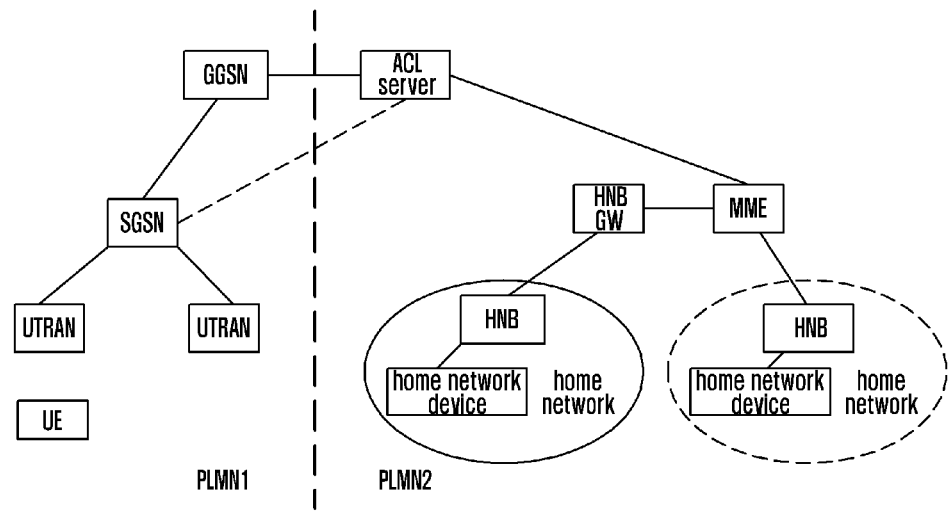
FIG. 21 is a schematic diagram illustrating another networking of scene 3 in accordance with an embodiment of the invention.

FIG. 21 is a schematic diagram illustrating another networking of scene 3 in accordance with an embodiment of the invention.

From FIGS. 17~21, it can be seen that HNB GW is a necessary network element device in a 3G network.

The scheme for remotely joining home network in a 3G network is the same as all the schemes described in foregoing embodiments. The only difference is that, the MME becomes the SGSN, the PDN-GW becomes the GGSN. The HeNB becomes the HNB.

Based on the above embodiment, a schematic diagram of a remote access system in the invention is provided in the following.

Figure 22:
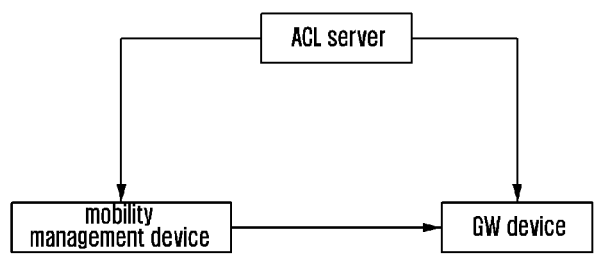
FIG. 22 is a block diagram illustrating constitution of a system for remotely accessing in accordance with an embodiment of the invention.

FIG. 22 is a block diagram illustrating constitution of a system for remotely accessing in accordance with an embodiment of the invention. As shown in FIG. 22, the system includes a mobility management device, a GW device and an ACL server.

The mobility management device is configured to receive a remote access requesting message from UE, which includes UE identifier, type identifier of a service for remotely accessing a home network and identifier of a home base station; is configured to query according to contents in the remote access requesting message, to determine whether the UE possesses the right for accessing the home network under the control of the home base station, when determining the UE possesses the right, select a GW device, and send the contents in the remote access requesting message to the GW device; or, the mobility management device is firstly configured to select a GW device, and send the contents in the remote access requesting message to the GW device, and then the GW device determines whether the UE possesses the right for accessing the home network under the control of the home base station accessed by the UE.

The GW device, when determining the right for accessing the home network under the control of the home base station is possessed, is configured to search in the ACL server according to the identifier of the home base station, to obtain scope of available IP address for the home network under the control of the home base station, and allocate an IP address for the UE according to the scope of available IP address. The GW device is further configured to send the allocated IP address to the UE, to enable the UE to remotely access the home network under the control of the home base station according to the allocated IP address.

In FIG. 22, the mobility management device is configured to determine whether the UE belongs to a PLMN currently accessed by the UE according to the UE identifier; if the UE doesn't belong to current PLMN, the mobility management device is configured to search for the UE's subscription information in the ACL server or the HSS of the PLMN to which the UE belongs and determine whether the UE possesses the right for accessing the home network under the control of the home base station according to the UE's subscription information; if the UE belongs to current PLMN, the mobility management device is configured to determine whether the home base station belongs to the PLMN currently accessed by the UE according to the identifier of the home base station; if the home base station doesn't belong to current PLMN, the mobility management device is configured to search in the ACL server of the PLMN to which the home base station belongs, so as to determine whether the UE possesses the right for accessing the home network under the control of the home base station; if the home base station belongs to current PLMN, the mobility management device is configured to determine whether the UE is a subscriber of the home base station according to the UE's subscriber information, if yes, the UE is determined to possess the right for accessing the home network under the control of the home base station; otherwise, the mobility management device is configured to search in the ACL server of current PLMN, so as to determine whether the UE possesses the right for accessing the home base station.

Or, in FIG. 22, the mobility management device is configured to determine whether the UE belongs to a PLMN currently accessed by the UE according to the UE identifier; if the UE doesn't belong to current PLMN, the mobility management device is configured to select a GW device, and send the contents in the remote access requesting message to the GW device; if the UE belongs to current PLMN, the mobility management device is configured to determine whether the home base station belongs to the PLMN currently accessed by the UE according to the identifier of the home base station; if the home base station doesn't belong to current PLMN, the mobility management device is configured to select a GW device, and send the contents in the remote access requesting message to the GW device; if the home base station belongs to current PLMN, the mobility management device is configured to determine whether the UE is a subscriber of the home base station according to the UE's subscriber information, if not, the mobility management device is further configured to select a GW device, and send the contents in the remote access requesting message to the GW device.

The GW device is configured to obtain address of the ACL sever in a PLMN to which the home base station belongs according to the identifier of the home base station, when receiving the contents in the remote access requesting message sent by the mobility management device, and search in the ACL server, to determine whether the UE possesses the right for accessing the home network under the control of the home base station.

In FIG. 22, the ACL server stores a home base station list, including identifiers of all the home base stations which may be accessed by each subscribed-UE; name of each device, which may be accessed in the home network under the control of each home base station; IP address of access device in the home network under the control of each home base station, and scope of available IP address; and a home base station list, including identifiers of all the home base stations, which may be accessed by each non-subscribed UE.

In FIG. 22, the mobility management device is configured to determine whether the UE belongs to a PLMN currently accessed by the UE according to the UE identifier; if the UE belongs to current PLMN, the mobility management device is configured to determine whether the UE is a subscriber of the home base station according to the UE's subscription information; if the UE is a subscriber of the home base station, the mobility management device is configured to select a corresponding GW device according to the UE's subscription information;

if the UE is not a subscriber of the home base station, the mobility management device is configured to select a GW device in a PLMN to which the home base station belongs, according to indication of the UE's subscription information, or to select a GW device in a PLMN to which the UE belongs, according to the indication of the UE's subscription information, still or to select a GW device in a PLMN to which the home base station belongs, when the UE's subscription information indicates that GW device in a PLMN, to which the UE belongs, may be accessed; if the UE doesn't belong to current PLMN, the mobility management device is configured to select a GW device in a PLMN to which the home base station belongs, according to indication of the UE's subscription information, or to select a GW device in a PLMN to which the UE belongs according to the indication of the UE's subscription information, or still to select a GW device in a PLMN to which the home base station belongs, when the UE's subscription information indicates that GW device in a PLMN to which the UE belongs may be accessed.

In FIG. 22, the mobility management device is further configured to return a remote access rejection message to the UE, when determining the UE fails to possess the right for accessing the home network under the control of the home base station. Or, the GW device is further configured to return a remote access rejection message to the UE, when determining the UE fails to possess the right for accessing the home network under the control of the home base station.

In FIG. 22, the mobility management device is MME, the GW device is PDN-GW, the home base station is HeNB. Or, the mobility management device is SGSN, the GW device is GGSN, the home base station is the HNB.

In view of above, the mobility management device in the embodiments of the invention may receive a remote access requesting message sent by UE; the mobility management device may query according to contents in the remote access requesting message, to determine whether the UE possesses the right for accessing a home network under the control of the home base station, when determining the UE possesses the right, the mobility management device may select a GW device, and send the contents in the remote access requesting message to the GW device; or, the mobility management device may firstly select a GW device, and send the contents in the remote access requesting message to the GW device, and then the GW device determines whether the UE possesses the right for accessing the home network under the control of the home base station currently accessed by the UE; when determining the UE possesses the right for accessing the home network under the control of the home base station, the GW device searches in the ACL server according to the identifier of the home base station, to obtain scope of available IP address for the home network under the control of the home base station, and allocates an IP address for the UE according to scope of available IP address. The GW device sends the allocated IP address to the UE, to enable the UE to remotely access the home network under the control of the home base station according to the allocated IP address. The above technical scheme may enable a subscriber to remotely access a home network, even if the subscriber is not in the home network.

INDUSTRIAL APPLICABILITY

The foregoing is only preferred embodiments of the invention, which is not used for limiting the protection scope of the invention. Any modifications, equivalent substitutions, improvements, etc, within the spirit and principle of the invention, should be covered by the protection scope of the invention.

The invention claimed is:

1. A method for remotely accessing a home network, comprising:

receiving, by a mobility management device, a remote access requesting message sent by User Equipment (UE), wherein the remote access requesting message comprises UE identifier, type identifier of a service for remotely accessing a home network and identifier of a home base station;

querying, by the mobility management device, according to contents in the remote access requesting message, to determine whether the UE possesses right for accessing the home network under the control of the home base station, when determining the UE possesses the right, selecting, by the mobility management device, a GateWay (GW) device, and sending the contents in the remote access requesting message to the GW device; or selecting a GW device by the mobility management device firstly, sending the contents in the remote access requesting message to the GW device, wherein whether the UE possesses the right for accessing the home network under the control of the home base station currently accessed by the UE is determined by the GW device, wherein when determining whether the UE possesses the right for accessing the home network under the control of the home base station, a scope of an available IP address for the home network under the control of the home base station is obtained from an Access Control List (ACL) server according to the identifier of the home base station, and an IP address for the UE is allocated according to the scope of the available IP address by the GW device.

2. The method according to claim 1, wherein querying by the mobility management device according to the contents in the remote access requesting message, to determine whether the UE possesses right for accessing the home network under the control of the home base station comprises:
- determining, by the mobility management device, whether the UE belongs to a Public Land Mobile Network (PLMN) currently accessed by the UE according to the UE identifier;
- when the UE doesn't belong to current PLMN, searching for the UE's subscription information by the mobility management device in the ACL server or Home Subscriber Server (HSS) in a PLMN to which the UE belongs, and determining whether the UE possesses the right for accessing the home network under the control of the home base station according to the UE's subscription information;
- when the UE belongs to current PLMN, determining, by the mobility management device, whether the home base station belongs to the PLMN currently accessed by the UE, according to the identifier of the home base station;
- when the home base station doesn't belong to current PLMN, searching, by the mobility management device, the ACL server of a PLMN to which the home base station belongs, to determine whether the UE possesses the right for accessing the home network under the control of the home base station; and
- when the home base station belongs to current PLMN, determining by the mobility management device whether the UE is a subscriber of the home base station according to the UE's subscription information, if yes, determining the UE possesses the right for accessing the home network under the control of the home base station, otherwise, searching by the mobility management device the ACL server of current PLMN, to determine whether the UE possesses the right for accessing the home base station.

3. The method according to claim 1, wherein selecting a GW device by the mobility management device firstly, sending the contents in the remote access requesting message to the GW device comprises:
- determining, by the mobility management device, whether the UE belongs to a PLMN accessed by the UE according to the UE identifier;
- when the UE doesn't belong to current PLMN, selecting the GW device by the mobility management device, sending the contents in the remote access requesting message to the GW device;
- when the UE belongs to current PLMN, determining, by the mobility management device, whether the home base station belongs to a PLMN accessed by the UE according to the identifier of the home base station;
- when the home base station doesn't belong to current PLMN, selecting the GW device by the mobility management device, sending the contents in the remote access requesting message to the GW device; and
- when the home base station belongs to current PLMN, determining, by the mobility management device, whether the UE is a subscriber of the home base station according to the UE's subscription information, if not, selecting the GW device by the mobility management device, sending the contents in the remote access requesting message to the GW device.

4. The method according to claim 1, wherein the ACL server comprises:
- a home base station list, comprising identifiers of all the home base stations, which are able to be accessed by each subscribed-UE;
- name of each device, which is able to be accessed in the home network under the control of each home base station;
- an IP address of an access device in the home network under the control of each home base station, the scope of the available IP address; and
- a home base station list, comprising identifiers of all the home base stations, which are able to be accessed by each non-subscribed UE.

5. The method according to claim 1, wherein selecting by the mobility management device the GW device comprises:
- determining, by the mobility management device, whether the UE belongs to the PLMN accessed by the UE, according to the UE identifier;
- when the UE belongs to current PLMN, determining, by the mobility management device, whether the UE is a subscriber of the home base station according to the UE's subscription information; if yes, selecting by the mobility management device a corresponding GW device according to the UE's subscription information; if not, selecting, by the mobility management device, a GW device in the PLMN to which the home base station belongs, according to the UE's subscription information, or selecting a GW device in the PLMN to which the UE belongs, according to indication of the UE's subscription information, or selecting a GW device in the PLMN to which the home base station belongs, when the UE's subscription information indicates that GW device in the PLMN to which the UE belongs is able to be accessed; and
- when the UE doesn't belong to current PLMN, selecting, by the mobility management device, a GW device in the PLMN to which the home base station belongs, according to the UE's subscription information, or selecting a GW device in the PLMN to which the UE belongs according to indication of the UE's subscription information, or selecting a GW device in the PLMN to which the home base station belongs, when the UE's subscription information indicates that GW device in the PLMN to which the UE belongs is able to be accessed.

6. The method according to claim 1, wherein the remote access requesting message comprises:
- a Public Data Network (PDN) connection establishment requesting message, or a service requesting message, or a bear establishment requesting message.

7. The method according to claim 1, further comprising:
- when determining the UE fails to possess the right for accessing the home network under the control of the home base station, returning, by the mobility management device, a remote access rejection message to the UE.

8. The method according to claim 1, wherein the mobility management device is a Mobility Management Entity (MME), the GW device is a PDN-GW, the home base station is a Home enhanced Node B (HeNB); or
- the mobility management device is a Serving General Packet Radio Service (GPRS) Supporting Node (SGSN), the GW device is a Gateway GPRS Supporting Node (GGSN), the home base station is a Home Node B (HNB).

9. A method for registering an available IP address in a home network in, the method comprising:
- establishing, by a home base station, a secure tunnel with a security GateWay (GW), after the home base station starting up and initializing; and reporting, by the home base station, an IP address allocated for the home base station and a scope of the available IP address to an Operation Administration Maintenance (OAM) server, wherein the IP address allocated for the home base station is allocated after authenticating the home base station successfully, the scope of the available IP address is provided by the security GW, and the IP address allocated for the home base station and IP address in the scope of the available IP address belong to one address pool, wherein the IP address of the home base station and the scope of the available IP address is reported to an Access Control List (ACL), server by the OAM server.

10. A method for remotely accessing a home network, the method comprising:

receiving, by a Gate Way (GW) device, contents in a remote access requesting message from a mobility management device, wherein the remote access requesting message is sent by User Equipment (UE) and comprises UE identifier, type identifier of a service for remotely accessing a home network and identifier of a home base station;

determining, by the GW device, whether the UE possesses right for accessing the home network under the control of the home base station currently accessed by the UE;

when determining the UE possesses the right for accessing the home network under the control of the home base station, searching in an Access Control List (ACL) server by the GW device according to the identifier of the home base station, to obtain a scope of an available IP address for the home network under the control of the home base station, and allocating an IP address for the UE according to the scope of the available IP address; and sending, by the GW device, the allocated IP address to the UE, to enable the UE to remotely access the home network under the control of the home base station according to the allocated IP address.

11. The method according to claim 10, wherein the determining, by the OW device, of whether the UE possesses the right for accessing the home network under the control of the home base station currently accessed by the UE comprises:

when the UE doesn't belong to current PLMN, obtaining, by the GW device, address of the ACL server in a PLMN to which the home base station belongs according to the identifier of the home base station, searching by the GW device the ACL server, to determine whether the UE possesses the right for accessing the home network under the control of the home base station;

when the home base station doesn't belong to current PLMN, obtaining, by the GW device, the address of the ACL server in a PLMN to which the home base station belongs, according to the identifier of the home base station, searching by the GW device the ACL server, to determine whether the UE possesses the right for accessing the home network under the control of the home base station; and when the home base station belongs to current PLMN, searching, by the GW device, the ACL server in current PLMN, to determine whether the UE possesses the right for accessing the home network under the control of the home base station.

12. The method according to claim 10, further comprising:

when determining the UE fails to possess the right for accessing the home network under the control of the home base station, returning, by the GW device, the remote access rejection message to the UE.

* * * * *